US011999178B2

(12) United States Patent
Miller et al.

(10) Patent No.: US 11,999,178 B2
(45) Date of Patent: Jun. 4, 2024

(54) CLOSED-LOOP FEEDBACK PRINTING SYSTEM

(71) Applicant: BALL CORPORATION, Westminster (CO)

(72) Inventors: Michael W. Miller, Erie, CO (US); Adam P. S. Stowitts, Arvada (CO)

(73) Assignee: BALL COPORATION, Westminster (CO)

( * ) Notice: Subject to any disclaimer, the term of this patent is extended or adjusted under 35 U.S.C. 154(b) by 166 days.

(21) Appl. No.: 17/421,625

(22) PCT Filed: Jan. 10, 2020

(86) PCT No.: PCT/US2020/013048
§ 371 (c)(1),
(2) Date: Jul. 8, 2021

(87) PCT Pub. No.: WO2020/146713
PCT Pub. Date: Jul. 16, 2020

(65) Prior Publication Data

US 2022/0126599 A1 Apr. 28, 2022

Related U.S. Application Data

(60) Provisional application No. 62/791,129, filed on Jan. 11, 2019.

(51) Int. Cl.
*B41J 29/38* (2006.01)
*B41J 3/407* (2006.01)

(52) U.S. Cl.
CPC ........... *B41J 3/40733* (2020.08); *B41J 29/38* (2013.01)

(58) Field of Classification Search
CPC ........ B41J 29/38; B41J 3/40733; B41F 31/05; B65D 1/0223; B65D 25/00
See application file for complete search history.

(56) References Cited

U.S. PATENT DOCUMENTS

| | | | |
|---|---|---|---|
| 3,252,410 | A | 5/1966 | Stephenson |
| 3,286,302 | A | 11/1966 | Doering |

(Continued)

FOREIGN PATENT DOCUMENTS

| | | | |
|---|---|---|---|
| CA | 2097619 | A1 | 5/1992 |
| CH | 654524 | A5 | 2/1986 |

(Continued)

OTHER PUBLICATIONS

International Search Report; priority document.

(Continued)

*Primary Examiner* — Lam S Nguyen
(74) *Attorney, Agent, or Firm* — Greer, Burns & Crain, Ltd.

(57) ABSTRACT

A system for decorating multiple containers in a single manufacturing run has a decorator, which includes a source of ink and print site where an ink graphic is deposited to each container in a plurality of containers that make up a manufacturing queue. An inspection station is located downstream from the decorator. The inspection station performs an optical evaluation of a quality of a pattern of ink deposited on at least one container in the plurality of containers A closed-loop feedback is responsive to the inspection station wherein the decorator is automatically adjusted in response to the optical evaluation performed at the inspection station.

9 Claims, 5 Drawing Sheets

(56) References Cited

U.S. PATENT DOCUMENTS

| | | | |
|---|---|---|---|
| 3,752,073 | A | 8/1973 | Lorber |
| 3,766,851 | A | 10/1973 | Sirvet et al. |
| 3,991,673 | A | 11/1976 | Coale et al. |
| 4,142,462 | A | 3/1979 | Gilore |
| 4,384,518 | A | 5/1983 | Albin |
| 4,395,946 | A | 8/1983 | Price |
| 4,519,310 | A | 5/1985 | Shimizu et al. |
| 4,884,504 | A | 12/1989 | Sillars |
| 4,889,560 | A | 12/1989 | Jaeger et al. |
| 4,898,752 | A | 2/1990 | Cavagna et al. |
| 4,903,599 | A | 2/1990 | Kulber et al. |
| 5,010,814 | A | 4/1991 | Shishikura |
| 5,049,432 | A | 9/1991 | Ooms et al. |
| 5,181,471 | A | 1/1993 | Sillars |
| 5,213,043 | A | 5/1993 | Reimers et al. |
| 5,235,911 | A | 8/1993 | Dorfman et al. |
| 5,282,306 | A | 2/1994 | Katsuhiro |
| 5,339,731 | A | 8/1994 | Howard et al. |
| 5,351,617 | A | 8/1994 | Williams et al. |
| 5,353,703 | A | 10/1994 | Rieker |
| 5,385,092 | A | 1/1995 | Lewis et al. |
| 5,469,787 | A | 11/1995 | Turner et al. |
| 5,502,476 | A | 3/1996 | Neal et al. |
| 5,591,255 | A | 1/1997 | Small et al. |
| 5,713,288 | A | 2/1998 | Frazzitta |
| 5,806,427 | A | 9/1998 | Niemiro et al. |
| 5,908,505 | A | 6/1999 | Bargenguest et al. |
| 5,919,839 | A | 7/1999 | Titterington et al. |
| 5,970,865 | A | 10/1999 | Horth et al. |
| 5,974,974 | A | 11/1999 | Agnew et al. |
| 6,037,101 | A | 3/2000 | Telser et al. |
| 6,058,839 | A | 5/2000 | Frazzitta |
| 6,139,779 | A | 10/2000 | Small et al. |
| 6,174,937 | B1 | 1/2001 | Banning et al. |
| 6,196,675 | B1 | 3/2001 | Deily et al. |
| 6,238,837 | B1 | 5/2001 | Fan |
| 6,309,453 | B1 | 10/2001 | Banning et al. |
| 6,312,872 | B1 | 11/2001 | Murphy |
| 6,395,123 | B1 | 5/2002 | Fromson et al. |
| 6,408,748 | B1 | 6/2002 | Hajek et al. |
| 6,494,950 | B1 | 12/2002 | Fujita et al. |
| 6,543,350 | B2 | 4/2003 | Gilliam et al. |
| 6,550,389 | B1 | 4/2003 | Goto et al. |
| 6,553,907 | B2 | 4/2003 | Richards |
| 6,594,927 | B2 | 7/2003 | Witkowski |
| 6,640,713 | B2 | 11/2003 | Landsman |
| 6,651,559 | B2 | 11/2003 | Haraux et al. |
| 6,779,445 | B2 | 8/2004 | Schaed |
| 6,779,455 | B2 | 8/2004 | Figoy et al. |
| 6,899,998 | B2 | 5/2005 | Figoy |
| 6,920,822 | B2 | 7/2005 | Finan |
| 7,309,563 | B2 | 12/2007 | Paul et al. |
| 7,464,642 | B2 | 12/2008 | Schaede |
| 7,669,531 | B2 | 3/2010 | Baker et al. |
| 7,691,549 | B1 | 4/2010 | Glasser |
| 7,810,922 | B2 | 10/2010 | Gervasi et al. |
| 7,997,199 | B2 | 8/2011 | Watanabe et al. |
| 8,034,207 | B2 | 10/2011 | Hunahata |
| 8,409,698 | B2 | 4/2013 | Byers et al. |
| 8,544,385 | B2 | 10/2013 | Schuler-Cossette et al. |
| 9,409,433 | B2 | 8/2016 | Carreras |
| 9,475,276 | B2 | 10/2016 | Fleischer et al. |
| 9,555,616 | B2 | 1/2017 | Carreras et al. |
| 2002/0083855 | A1 | 4/2002 | Samworth |
| 2002/0178945 | A1 | 12/2002 | Richards |
| 2003/0015105 | A1 | 1/2003 | Dewig |
| 2003/0056410 | A1 | 3/2003 | Witkowski |
| 2003/0089261 | A1 | 5/2003 | Landsman |
| 2003/0101885 | A1 | 6/2003 | Jordan |
| 2003/0150346 | A1 | 8/2003 | Haraux et al. |
| 2004/0011234 | A1 | 1/2004 | Figoy et al. |
| 2004/0126682 | A1 | 7/2004 | Dreher et al. |
| 2004/0173110 | A1 | 9/2004 | Roesch |
| 2004/0191693 | A1 | 9/2004 | Takamiya |
| 2005/0098051 | A1 | 5/2005 | Flint et al. |
| 2005/0199151 | A1 | 9/2005 | Holten et al. |
| 2006/0137548 | A1 | 6/2006 | Vetter |
| 2006/0193673 | A1 | 8/2006 | Baker et al. |
| 2009/0303307 | A1 | 12/2009 | Yasumatsu |
| 2010/0031834 | A1 | 2/2010 | Morgavi et al. |
| 2010/0229737 | A1 | 9/2010 | Ouchi |
| 2010/0295885 | A1 | 11/2010 | LaCaze |
| 2010/0319555 | A1 | 12/2010 | Hashimoto et al. |
| 2011/0104615 | A1 | 5/2011 | Sievers |
| 2011/0126760 | A1 | 6/2011 | Daems et al. |
| 2011/0162542 | A1 | 7/2011 | Nakamura et al. |
| 2011/0283905 | A1 | 11/2011 | Sakata |
| 2012/0103216 | A1 | 5/2012 | Knisel et al. |
| 2012/0204746 | A1 | 8/2012 | Fullgraf |
| 2012/0216689 | A1 | 8/2012 | Cochran et al. |
| 2012/0238675 | A1 | 9/2012 | Kataura et al. |
| 2012/0274695 | A1 | 11/2012 | LaCaze et al. |
| 2012/0315412 | A1 | 12/2012 | Clayton et al. |
| 2013/0075675 | A1 | 3/2013 | Krutak et al. |
| 2013/0087059 | A1 | 4/2013 | Baird et al. |
| 2013/0105743 | A1 | 5/2013 | Owen et al. |
| 2013/0176358 | A1 | 7/2013 | Yamada et al. |
| 2013/0193022 | A1 * | 8/2013 | Uptergrove ............ B65D 25/00 206/459.5 |
| 2013/0228086 | A1 | 9/2013 | Baldwin et al. |
| 2013/0231242 | A1 | 9/2013 | Clayton et al. |
| 2013/0242276 | A1 | 9/2013 | Schadebrodt et al. |
| 2013/0340885 | A1 | 12/2013 | Clayton et al. |
| 2014/0039091 | A1 | 2/2014 | Owen et al. |
| 2014/0072442 | A1 | 3/2014 | Bowman et al. |
| 2014/0187668 | A1 | 7/2014 | Owen et al. |
| 2014/0210201 | A1 | 7/2014 | Owen et al. |
| 2014/0212654 | A1 | 7/2014 | Clayton et al. |
| 2014/0272161 | A1 | 9/2014 | Clayton et al. |
| 2015/0138295 | A1 * | 5/2015 | Lindner ............... B65D 1/0223 347/110 |
| 2015/0174891 | A1 | 6/2015 | Boas et al. |
| 2015/0183211 | A1 | 7/2015 | Petti et al. |
| 2015/0290923 | A1 | 10/2015 | Treloar |
| 2016/0001546 | A1 | 1/2016 | Hughes et al. |
| 2016/0129687 | A1 | 5/2016 | Boas et al. |
| 2016/0229198 | A1 | 8/2016 | Izume |
| 2016/0347048 | A1 | 12/2016 | Carreras |
| 2017/0013452 | A1 | 4/2017 | Boas et al. |
| 2017/0157964 | A1 | 6/2017 | Izume |
| 2017/0334659 | A1 | 11/2017 | Leitzen et al. |
| 2018/0009216 | A1 | 1/2018 | Egerton et al. |
| 2018/0009217 | A1 | 1/2018 | Henrik |
| 2018/0024076 | A1 * | 1/2018 | Efner ...................... B41F 31/05 101/40.1 |
| 2018/0201011 | A1 | 7/2018 | Efner |
| 2018/0222212 | A1 | 8/2018 | Mayer et al. |

FOREIGN PATENT DOCUMENTS

| | | | |
|---|---|---|---|
| CN | 101128733 | A | 2/2008 |
| CN | 101808825 | A | 8/2010 |
| CN | 102143846 | A | 8/2011 |
| CN | 103109233 | A | 5/2013 |
| DE | 102006025897 | A1 | 1/2007 |
| EP | 202928 | A2 | 11/1986 |
| EP | 545862 | A1 | 6/1993 |
| EP | 0717320 | A1 | 6/1996 |
| EP | 1162064 | A2 | 12/2001 |
| EP | 2153991 | A1 | 2/2010 |
| EP | 2196314 | A1 | 6/2010 |
| EP | 2317387 | A2 | 5/2011 |
| EP | 2384890 | A1 | 11/2011 |
| EP | 3028856 | B1 | 6/2016 |
| EP | 3050705 | A1 | 8/2016 |
| GB | 1298205 | A | 11/1972 |
| GB | 2512678 | A | 10/2014 |
| JP | S5849256 | A | 3/1983 |
| JP | 2000258899 | A | 9/2000 |
| JP | 2001030612 | A | 2/2001 |
| JP | 2007076209 | A | 3/2007 |
| WO | 9407693 | A1 | 4/1994 |
| WO | 9817474 | A1 | 4/1998 |
| WO | 9841966 | A1 | 9/1998 |

(56) References Cited

FOREIGN PATENT DOCUMENTS

| | | | |
|---|---|---|---|
| WO | 0027644 | A1 | 5/2000 |
| WO | 0112440 | A1 | 2/2001 |
| WO | 2004069539 | A2 | 8/2004 |
| WO | 2005047011 | A1 | 5/2005 |
| WO | 2007051660 | A1 | 5/2007 |
| WO | 2008092940 | A2 | 8/2008 |
| WO | 2009090389 | A1 | 7/2009 |
| WO | 2012148576 | A1 | 11/2012 |
| WO | 2013028804 | A1 | 2/2013 |
| WO | 2013113616 | A2 | 8/2013 |
| WO | 2013115800 | A1 | 8/2013 |
| WO | 2013155423 | A2 | 10/2013 |
| WO | 2014006517 | A1 | 1/2014 |
| WO | 2014008544 | A1 | 1/2014 |
| WO | 2014096088 | A2 | 6/2014 |
| WO | 2014108489 | A1 | 7/2014 |
| WO | 2014128200 | A2 | 8/2014 |
| WO | 2014144853 | A2 | 9/2014 |
| WO | 2015101828 | A1 | 7/2015 |
| WO | 2016183452 | A1 | 11/2016 |
| WO | 2017201398 | A1 | 11/2017 |
| WO | 2018013465 | A1 | 1/2018 |

OTHER PUBLICATIONS

Written Opinion and Search Report for PCT/GB2015/053725 dated Feb. 25, 2016 (9 pages).
Stolle machinery Company, "Concord 36MRT Decorator, Operating and Maintenance Manual" Centennial, CO, 133 pages.
Examination Search Report for corresponding Canadian Patent Application No. 2,968,923 dated Mar. 15, 2018 (3 pages).
"What is Offset Printing (Offset Lithography)?" TechTarget, 2016, 13 pages [retrieved online from: whatis.techtarget.com/definition/offset-printing-offset-lithography].
Third Party Observations for European Patent Application No. 14810948.1, dated Dec. 21, 2016; 5 pages.
Third Party Observations for European Patent Application No. 14810948.1, dated Jan. 29, 2018; 5 pages.
"Printmaking," Wikipedia, Feb. 12, 2015, retrieved from http://en.wikipedia.org/wiki/printmaking, 14 pages.
"Plate," PrintWiki, retrieved Feb. 9, 2015 from http://printwiki.org/Plate, 6 pages.
"Offset Printing/Dry Offset," Buse Printing & Packaging, 2016, 1 page [retrieved online from: buseprinting.com/offset_printing.html].
"Offset Printing," BusinessDictionary.com, 2015, 2 pages [retrieved online from: www.businessdictionary.com/definition/offset-printing.html].
"Offset Printing," Offset Printing Technology, 2016, 4 pages [retrieved online from: www.offsetprintingtechnology.com].
"Offset Printing," Wikipedia, Dec. 11, 2014, retrieved from http://en.wikipedia.org/wiki/offset_printing, 12 pages.
Office Action for corresponding Japanese Patent Application No. 2017-530183 and Translation (6 pages).
"Offset Lithography," PrintWiki, retrieved Feb. 9, 2015 from http://printwiki.org/offset_lithography, 8 pages.
Official Action for U.S. Appl. No. 14/686,517, dated Oct. 15, 2015; 5 pages.
Official Action for U.S. Appl. No. 14/301,018, dated May 13, 2015; 5 pages.
Official Action for U.S. Appl. No. 15/231,128, dated Jul. 13, 2017; 8 pages.
Official Action for U.S. Appl. No. 14/301,018, dated Dec. 15, 2015; 8 pages.
Official Action for U.S. Appl. No. 14/005,873, dated Aug. 26, 2015, 27 pages.
Official Action for U.S. Appl. No. 14/301,018, dated Aug. 14, 2015; 10 pages.
Notice of Allowance for U.S. Appl. No. 14/686,517, dated Sep. 13, 2016; 9 pages.
Notice of Allowance for U.S. Appl. No. 15/231,128, dated Jan. 5, 2018; 8 pages.
Notice of Allowance for U.S. Appl. No. 14/301,018, dated Apr. 6, 2016; 10 pages.
M. Mine "How Offset Printing Works," retrieved on Feb. 9, 2015 from www.howstuffworks.com/offset-printing.htm/printable, 5 pages.
"Luminous Paint," Wikipedia, Jul. 7, 2014, retrieved from http://en.wikipedia.org/wiki/luminous_paint, 4 pages.
"Laser Engraving," Wikipedia, Jan. 16, 2015, retrieved from http://en.wikipedia.org/wiki/laser_engraving, 10 pages.
"Flexography," Wikipedia, Dec. 15, 2014, retrieved from http://en.wikipedia.org/wiki/flexorgraphic, 6 pages.
"Flexographic Ink," Wikipedia, Sep. 18, 2014, retrieved from http://en.wikipedia.org/wiki/flexographic_ink, 2 pages.
Extended Search Report for European Patent Application No. 14810948.1, dated Apr. 11, 2017; 10 pages.
"EPDM Rubber," Wikipedia, Oct. 24, 2014, retrieved from http://enwikipedia.org/wiki/EPDM_rubber, 3 pages.
"DuPont™ Cyrel® NOWS: Rugged, High-Performance Analog Plate," DuPont, 2007, retrieved from http:www2.dupont.com/packaging_graphics/en_us/assests/downloads/pdf/Cyrel_NOWS.pdf, 2 pages.
"DuPont™ Cyrel® DPR: Robust Digital Plate for Highest Quality Printing," DuPont 2010, retrieved from http://www2.dupont.com/packaging_graphics/en_us/assets/downloads/pdf/DP_Cyrel_DS_DPR_us_low.pdf., 2 pages.
"DuPont™ Cyrel®: CyrelTM Digital flex plate Imagers (CDI)" DuPont, 2009, retrieved from http://www2.dupont.com/packaging_graphics/en_gb/assets/downloads/pdf/CDI_family_english.pdf, 8 pages.
"Dry Offset Printing," Encyclopedia Britannica, 2016, 2 pages [retrieved online from: www.britannica.com/technology/dry-offset].
"Cyrel® DSP High Performance Plate," DuPont, 2016, 2 pages [retrieved online from: www.dupont.com/products-and-services/printing-package-printing/flexographic-platemaking-systems/brands/cyrel/products/sub-products/cyrel-dsp.html].
"Chemical Milling," Wikipedia, Feb. 13, 2015, retrieved from http://en.wikipedia.org/wiki/chemical_milling, 6 pages.
Bowell et al., "Advancing Flexography: The Technical Path Forward," DuPont, 2011, retrieved from www2.dupont.com/packaging_graphics/en_us/assets/downloads/pdf/advflexo_brochure.pdf, 12 pages.
"Blanket for Offset Printing," Offset printing technology, 2016, 4 pages [retrieved from: www.offsetprintingtechnology.com.sub-categories/blanket-for-offset-printing/].
Mexican Office Action for corresponding Mexican Patent Application No. MX/a/2017/007140 dated Feb. 8, 2021.
Supplementary European Search Report for European Patent Application No. 20738981 dated Aug. 30, 2022.
Chinese Office Action for corresponding Chinese Patent Application No. 2023063000074900 dated Jun. 30, 2023.

* cited by examiner

CLOSED-LOOP FEEDBACK PRINTING SYSTEM

CROSS-REFERENCE TO RELATED APPLICATIONS

This Application is a United States National Stage Application under 35 U.S.C. Section 371 of International Patent Application No. PCT/US2020/013048 filed on Jan. 10, 2020, which is hereby incorporated by reference as if fully set forth herein. This Application also claims priority to and the benefit of U.S. Provisional Application No. 62/791,129, filed Jan. 11, 2019, which is also hereby incorporated by reference as if fully set forth herein.

FEDERALLY SPONSORED RESEARCH OR DEVELOPMENT

N/A

TECHNICAL FIELD

The invention relates to container decoration; more particularly, the invention relates to a closed-loop decorating container decorating control and system.

BACKGROUND OF THE INVENTION

Metal containers for food, beverages, and consumer products are typically produced at an extremely fast rate. Production rates for equipment used to manufacture metal containers are often time measured in thousands of articles produced per minute. For example, container decorating apparatuses can process approximately 2.5 million containers in a single day.

Metal container labeling is often printed directly onto the metal container surface, rather than applied to an intermediate member such as a paper product, foil, or other type of substrate. Thus, at a very high rate of production as explained above, it is imperative that any decorating anomalies are identified as soon as possible to avoid large numbers of defective containers. It further follows that halting a decorating apparatus, even for minutes, to correct printing anomalies is to be avoided.

It is known by those within the art that there are multiple approaches to design legible artwork on a printed substrate. The "artwork" referred to here may be actual brand logos, imagery, text, barcodes, or other identifying information. It is also known by those within the art that there may be multiple methods or process options to print a given image to a substrate, even within a single given printing technology. These multiple approaches all have different process windows in that they require different performance levels from the decorating apparatus.

The present invention is provided to solve the problems discussed above and other problems, and to provide advantages and aspects not provided by prior container decorating methods and systems of this type. A full discussion of the features and advantages of the present invention is deferred to the following detailed description, which proceeds with reference to the accompanying drawings.

SUMMARY OF THE INVENTION

The present invention is directed to systems and methods for decorating multiple containers in a manufacturing run utilizing a closed-loop feedback routine to automatically adjust decorator apparatus variables, controls, and output in an automatic and dynamic fashion, without user intervention.

One aspect of the invention is directed to a system for decorating multiple containers in a single manufacturing run. The system comprises a decorator, the decorator comprising: a source of ink; and a print site, wherein an ink graphic is deposited to each container in a plurality of containers that make up a manufacturing queue at the print site. The system further comprises an inspection station upstream from the decorator, the inspection station performing an evaluation of at least one manufacturing variable associated with at least one process upstream from the decorator on at least one container in the plurality of containers that make up the manufacturing queue. A closed-loop feedback is responsive to an evaluation performed at the inspection station wherein an automatic adjustment to at least one decorator parameter is made in response to the evaluation performed at the inspection station.

This aspect of the invention may include one or more of the following features, alone or in any reasonable combination. The ink graphic deposited on each subsequent container in the plurality of containers that make up the manufacturing queue may be automatically adjusted without user intervention in response to the evaluation performed at the inspection station. The system may further comprise one or more processors in communication with the inspection station and the decorator, the one or more processors controlling an analysis of the evaluation against a pre-determined manufacturing tolerance and a response to the evaluation by the decorator. The system may further comprise a non-transitory memory on which one or more software routines are stored which control the analysis of the evaluation and the response to the evaluation by the decorator. The automatic adjustment may be made to a manufacturing process upstream from the decorator in response to the evaluation. The automatic adjustment may be made to a manufacturing process downstream from the decorator in response to the evaluation. The automatic adjustment to the decorator in response to the evaluation may comprise degrading an attribute of print quality to ensure each container in the manufacturing queue continues without interruption. The automatic adjustment to the decorator may be in response to an optical evaluation, the automatic adjustment comprising improving an attribute of print quality to ensure process of each container in the manufacturing queue continues without interruption. The single manufacturing run may include a plurality of graphics, wherein a first subset of the plurality of containers receives a first graphic and a second subset of the plurality of containers receives a second graphic, and the first and second graphics are unique relative, or compared, to each other, and wherein the automatic adjustment to the decorator responsive to the evaluation comprises choosing one of the first or second graphics to be applied to one or more remaining undecorated containers in the manufacturing queue. The decorator may be automatically responsive to changes in atmospheric conditions via the closed-loop feedback.

Another aspect of the invention is directed to a method of optimizing a manufacturing of multiple containers in a single manufacturing run, the method comprising the steps of: (1) performing an inspection of at least one container in a plurality of containers that make up a manufacturing queue at an inspection station; (2) evaluating a manufacturing variable of a manufacturing process that is upstream of a container decorating station during the performing the inspection step; and (3) adjusting at least one decorating parameter on the container decorating station based on the evaluating step.

This aspect of the invention may include one or more of the following features, alone or any reasonable combination. The adjusting step may comprise selecting an art graphic to apply on at least one container in the plurality of containers that make up the manufacturing queue in response to the evaluating step. The manufacturing variable may be a quality of a basecoat applied to the at least one container in the plurality of containers that make up the manufacturing queue. The method may further comprise the step of: (4) reducing a duration of cure time of the art graphic delivered by a decorator in response to the evaluating step; (5) reducing a level of energy delivered by a source of energy in response to the evaluating step; (6) reducing a duration of time within a source of energy subsequent to applying a basecoat to a container and prior to applying the art graphic in response to the evaluating step; (7) reducing a level of energy delivered by a source of energy subsequent to applying a basecoat to a container and prior to applying the art graphic in response to the evaluating step; (8) adjusting a volume of material used to form the art graphic in response to the evaluating step; (9) increasing a volume of a basecoat applied to a container prior to applying the art graphic in response to the evaluating step; (10) increasing a duration of cure time of the art graphic delivered by a decorator in response to the evaluating step; (11) increasing a level of energy delivered by a source of energy in response to the evaluating step; (12) increasing a duration of time within a source of heat subsequent to applying a basecoat to a container and prior to applying the art graphic in response to the evaluating step; and/or (13) increasing a level of energy delivered by a source of energy subsequent to applying a basecoat to a container and prior to applying the art graphic in response to the evaluating step. The source of energy is selected from a group consisting of a source of thermal energy, a source of an electron beam, a source of ultraviolet radiation, and a source of infrared radiation.

Another aspect of the invention is directed to decorating multiple containers in a manufacturing run. The system comprises a decorator which includes a source of ink and a print site. An ink graphic is deposited on each container in a plurality of containers that make up a manufacturing queue at the print site. An inspection station is positioned downstream from the decorator in a manufacturing process. The inspection station performs an evaluation of a quality of a pattern of ink deposited on at least one container in the plurality of containers that make up the manufacturing queue. A closed-loop feedback is responsive to the inspection station wherein a manufacturing process is automatically adjusted in response to the evaluation performed at the inspection station.

This aspect of the invention may include one or more of the following features, alone or in any reasonable combination. The ink graphic deposited on each subsequent container in the plurality of containers that make up the manufacturing queue may be automatically adjusted without user intervention in response to the evaluation performed at the inspection station. One or more processors may be in communication with the inspection station and the decorator wherein the one or more processors control an analysis of the evaluation against a pre-determined manufacturing tolerance and a response to the evaluation by the inspection station. The system may further comprise a non-transitory memory on which one or more software routines are stored which control the analysis of the evaluation and the response to the evaluation by the decorator. An automatic adjustment may be made to a manufacturing process upstream from the decorator in response to the evaluation. An automatic adjustment to the decorator responsive to the evaluation may comprise degrading an attribute of print quality to ensure each container in the manufacturing queue continues without interruption. An automatic adjustment to the decorator responsive to the evaluation may comprise improving an attribute of print quality to ensure process of each container in the manufacturing queue continues without interruption. The manufacturing run may include a plurality of graphics, wherein a first subset of the plurality of containers receives a first graphic and a second subset of the plurality of containers receives a second graphic, and the first and second graphics are unique relative, or compared, to each other, and wherein an automatic adjustment to the decorator responsive to the evaluation comprises choosing one of the first or second graphics to be applied to one or more remaining undecorated containers in the manufacturing queue. The decorator may be automatically responsive to changes in atmospheric conditions via the closed-loop feedback. The ink graphic may include an embedded machine-readable code, and wherein when the evaluation identifies a degradation of a quality of the machine-readable code, the decorator responds by switching to a different machine-readable code. The evaluation may identify a pre-determined minimum acceptable resolution of the ink graphic, and the closed-loop feedback from the inspection device to the container decorator automatically adjusts a resolution of the ink graphic automatically in response to the evaluation. The plurality of containers may comprise a subset of the plurality of containers designated to receive a first ink graphic and a subset of the plurality of containers designated to receive a second ink graphic, which is different from the first graphic, and the evaluation recognizes an unrecoverable print quality issue associated with printing the first ink graphic which cannot be automatically corrected by the system, and the decorator prints remaining containers in the manufacturing queue with the second ink graphic in response thereto. An automatic adjustment may be made to a manufacturing process downstream from the decorator in response to the evaluation. An automatic adjustment is made to the decorator in response to the evaluation. The evaluation of the pattern of ink may be an optical evaluation.

Another aspect of the invention is directed to a method of optimizing a manufacturing of multiple containers in a single manufacturing run. The method comprises the steps of: (1) applying an art graphic on each container in a plurality of containers that make up a manufacturing queue; (2) performing an evaluation of the art graphic deposited on at least one container in the plurality of containers that make up the manufacturing queue; and (3) adjusting a manufacturing process in response to the evaluation.

This aspect of the invention may include one or more of the following features, alone or in any reasonable combination. The method may further comprise the steps of: (4) reducing a volume of material used to form the art graphic in response to the evaluation; (5) reducing a volume of a basecoat applied to a container prior to applying the art graphic in response to the evaluation; (6) reducing a duration of cure time of the art graphic delivered by a decorator in response to the evaluation; (7) reducing a level of curing energy delivered by a source of energy in response to the evaluation; (8) reducing a duration of time within a source of energy subsequent to applying a basecoat to a container and prior to applying the art graphic in response to the evaluation; (9) reducing a level of energy delivered by a source of energy subsequent to applying a basecoat to a container and prior to applying the art graphic in response to the evaluation; (10) increasing a volume of material used to form the art graphic in response to the evaluation; (11) increasing a volume of a basecoat applied to a container prior to applying the art graphic in response to the evaluation; (12) increasing a duration of cure time of the art graphic delivered by a decorator in response to the evaluation subsequent; (13) increasing a level of energy delivered by a source of energy in response to the evaluation; (14) increasing a duration of time within a source of energy subsequent to applying a basecoat to a container and prior to applying the art graphic in response to the evaluation; and/or (15) increasing a level of energy delivered by a source of energy subsequent to applying a basecoat to a container and prior to applying the art graphic in response to the evaluation.

According to this aspect, the source of energy may be a source of heat, an ultraviolet radiation, an infrared radiation, an electron beam.

Other features and advantages of the invention will be apparent from the following specification taken in conjunction with the following drawings.

BRIEF DESCRIPTION OF THE DRAWINGS

To understand the present invention, it will now be described by way of example, with reference to the accompanying drawings in which.

DETAILED DESCRIPTION

Figure 1:
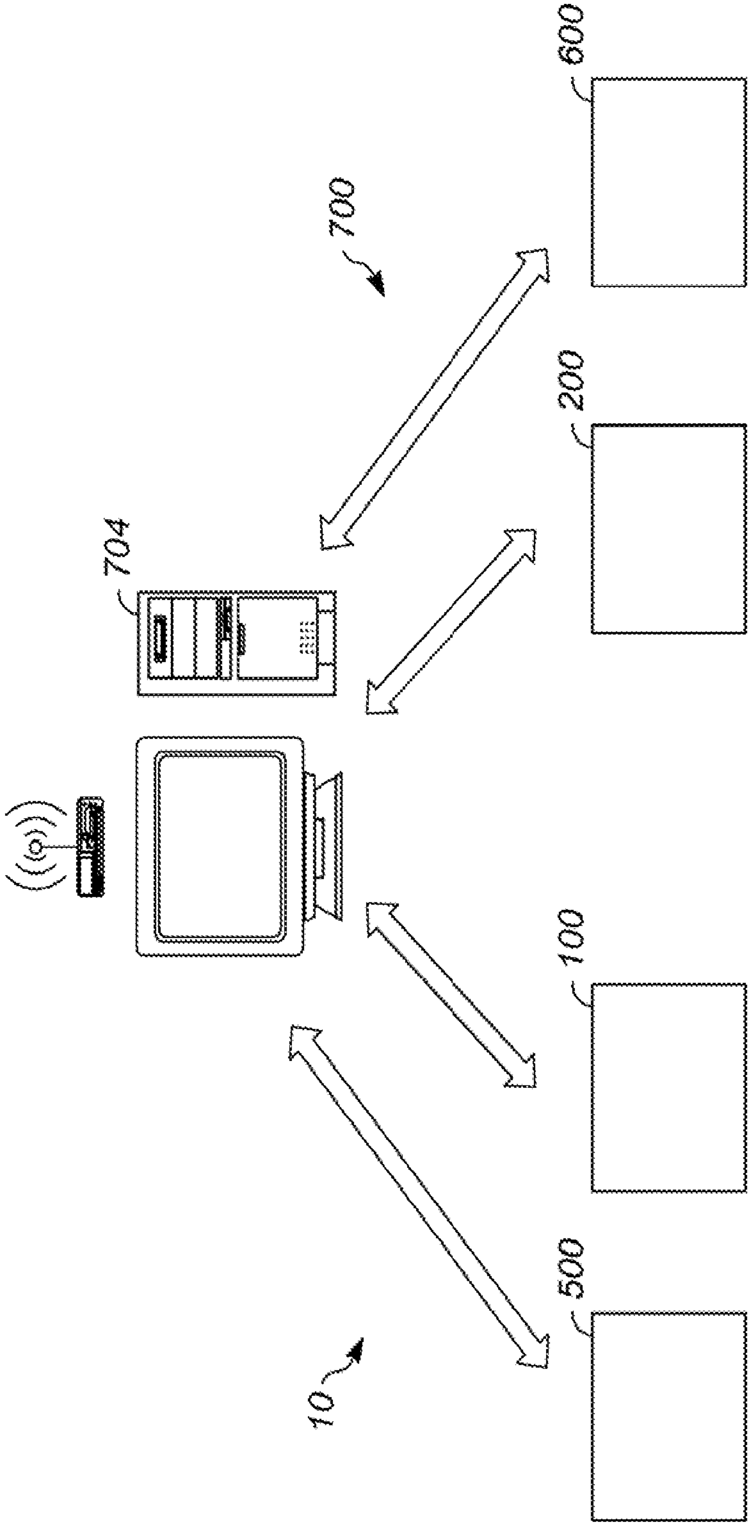
FIG. 1 is a schematic of a closed-loop feedback printing system.

While this invention is susceptible of embodiments in many different forms, there is shown in the drawings and will herein be described in detail preferred embodiments of the invention with the understanding that the present disclosure is to be considered as an exemplification of the principles of the invention and is not intended to limit the broad aspect of the invention to the embodiments illustrated.

The present disclosure is directed to a closed-loop feedback container printing system. This system allows for a dynamic adjustment of a printing process to ensure acceptable quality throughout a print run, where the print run comprises a plurality of containers, possibly hundreds of thousands of these containers, decorated individually and consecutively. Specific approaches to print process adjustments will vary by print technology, but all are enabled by the inspections and measurements performed in-line via any suitable inspection methods, including but not limited to optical evaluation, UV and/or infrared inspection, or otherwise, with the printing process. Thus, the closed-loop system may include optical and other non-optical related measurements such as surface energy.

One purpose the system is to allow additional front-end printing process preparation to overcome degradation of the physical printing process. With this additional front-end printing process preparation during a pre-press timeframe and a press setup timeframe, printing defects can be overcome to maintain acceptable print quality throughout a manufacturing cycle. A key aspect is the use of a closed-loop feedback process which enables these adjustments to occur automatically, potentially without operator intervention. Stated another way, if more preparation work is performed prior to printing, a given decoration line or apparatus will be more resilient against failure. This entails predicting how output is being affected by failures in the printing process and preparing, in advance, how to work around those failures to continue to create output within manufacturing tolerance and/or customer specifications without stopping the decorator.

Without this approach, once printing degrades to a point that the output (i.e. decoration on containers) is not acceptable, the print run must be halted and action taken by the operator. If multiple print source or print process options are prepared beforehand, then the optimal process window can be chosen at all times for the current state of the printer/decorator apparatus.

By using an inspection station with closed-loop feedback, the most appropriate printing source imagery or most appropriate printing process can be used. In some cases, this may result in choosing a slight degradation (as in, for example, reducing resolution, ink volume, number of design elements, number of colors, etc.) in print quality to keep the print line running, particularly applicable in cases where the print line may otherwise need to be stopped. In others, it may be a choice made to improve print (as in, for example, increasing resolution, ink volume, number of design elements, number of colors, etc.) quality if a different process or adjustment on the print line can be made.

Referring generally to FIG. 1, a system 10 of manufacturing a plurality of containers in a manufacturing queue 14 comprises a decorator 100, an inspection station 200, one or more computers 300, upstream and downstream processes 500,600 (relative to the decorator 100), and a closed-loop feedback system 700. The decorator 100 can be any type of container decorator currently used in the industry to apply graphic labeling on containers. These include dry offset type decorators, newer digital, ink-jet type printers, electrophotographic (EP) decorators, and toner-based decorators. The system is especially useful in conjunction with the newer digital, ink-jet type decorators.

In its simplest form, the decorator 100 includes a source of ink and a print site. The decorator deposits a pattern of ink representing an ink graphic on each container in a manufacturing queue 14 (see FIG. 2). This ink application takes place at the print site. This is common to many known decorators on the market today. Such decorators are known in the art and described, for example, in PCT/US2018/051717 and U.S. Pat. No. 9,873,358 B2, which are hereby incorporated by reference as if fully set forth herein.

Figure 2:
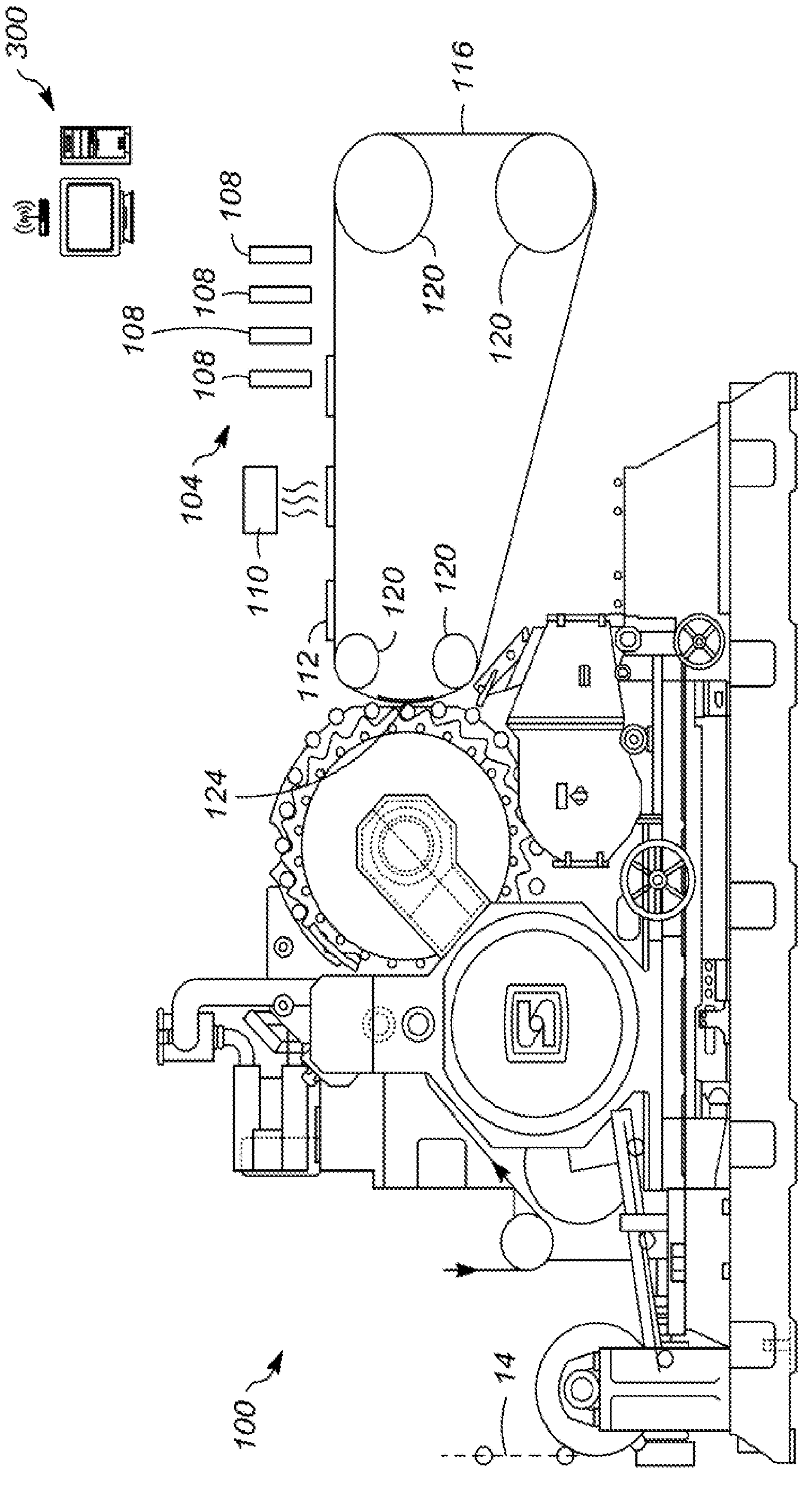
FIG. 2 is a container decorator used in conjunction with the closed-loop feedback system.

Referring to FIG. 2, a decorator 100 that may be utilized in the present system has an inker unit 104 comprising a plurality of print heads 108, typically 4 and preferable inkjet print heads. The print heads 108 deliver a volume of ink 112 in a desired pattern to an image transfer belt 116. Each inkjet head 108 delivers a quantity of ink 112 to the belt 116 to produce a desired pattern of ink 112 in a desired color, preferably multiple colors.

The image transfer belt 116 is supported on the module by one or more rollers 120 which impart rotational movement to the image transfer belt 116, such that the ink 112 pattern traverses from a location adjacent the print heads 108 to a print site 124 where engagement (i.e. contact) between the sidewall of the container and the image transfer belt 116 transfers the ink 112 to impart the finished art on the sidewall.

The image transfer belt 116 forms a circumferential member having an inner surface opposite a printing surface. The printing surface is configured to accept the volume of ink 112 from the inkjet heads 108 and transfer the ink 112 to the container sidewalls. The inner surface engages the rollers 120 which drive the image transfer belt 116. A curing substation 110 may be provided to cure an art graphic applied to the belt 116. Alternatively, a curing substation 110 may be provided to cure an art graphic to a container subsequent to deposit on the container. The curing can be performed by any of the known techniques, including but not limited to thermal curing, radiation curing, electron beam curing, pressure curing, etc., or any combination thereof.

A computer system 300 generally controls the decorator 100. The computer system 300 includes a processor and a non-transitory memory on which one or more software routines are stored. The computer 300 acts as controller that sends signals to the elements of the decorator. The computer 300 provides controls, commands, or signals which determine a shape of the desired pattern of ink 112 transferred from the plurality of inkjet printing heads 108 to the printing surface 132 of the image transfer belt 116. A length of the desired pattern of ink 112 on the image transfer belt 116 preferably corresponds to a length of a segment of the endless image transfer belt 116 which is either less than or equal to a circumference of each beverage container body 14 or greater than or equal to a circumference of each container.

Figure 3:
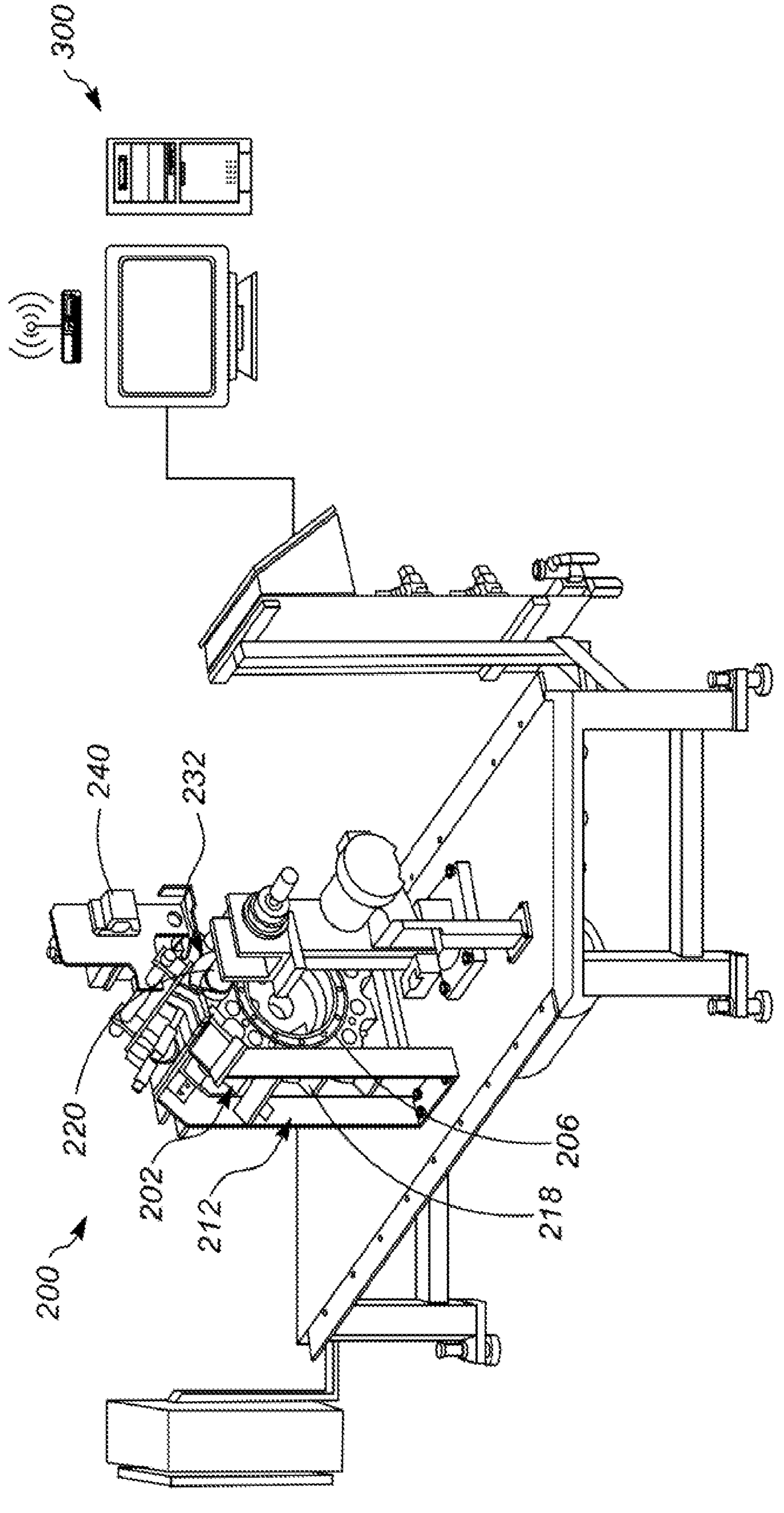
FIG. 3 is an inspection station used in conjunction with the closed-loop feedback printing system.

Referring to FIG. 3, the inspection station 200 may be located downstream in the manufacturing process from the decorator 100. Suitable inspection stations are known in the art and described, for example, in WO 2017/201398 A1, which is hereby incorporated by reference as if fully set forth herein. The inspection station 200 includes an imaging device, or imager, such as a camera. The inspection station 200 performs an optical evaluation of a quality of a pattern of ink deposited the container. This station 200 is primarily looking for decoration defects.

Figure 4:
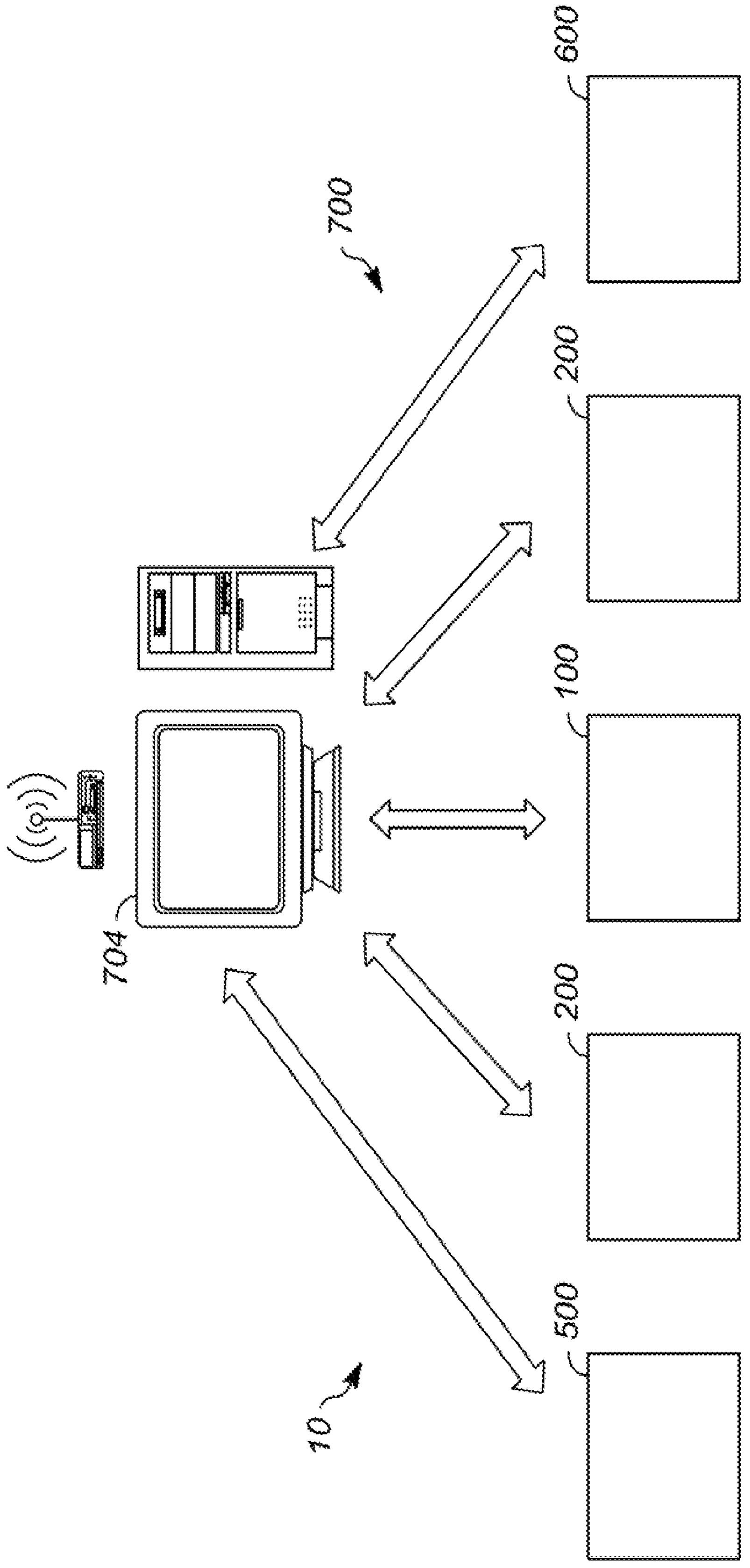
FIG. 4 is a schematic of a closed-loop feedback printing system providing an inspection station subsequent to upstream processes and prior to decoration.

As illustrated in FIG. 4, a similar inspection station 200 can be utilized prior to decoration and subsequent to upstream processes 500. This inspection station 200 can be used to evaluate upstream processing quality. For example, the inspection station 200 can be used to evaluate basecoating.

The inspection station 200 operates on an indexing operation. The indexer can be a turret 206 that sequentially transfers containers through the inspection station 200 along an index path in a predetermined, generally constant, orientation, here via counterclockwise rotation. In this example, the decorated containers are fed to the inspection station 200 via an infeed rail 202 to the index path at an entrance position on a multi-position turret 206 and are discharged from the inspection station 200 at the exit position 212.

The circumferential turret 206 rotates about a central axis. It has a plurality of pockets 218 adapted, as in sized and shaped, to support, control, and properly retain the sidewall of the containers therein in a predetermined orientation and to prevent misalignment of the container relative to a mandrel 220, which is used during the act of inspecting the container. The turret acts as an isolating device to take a container off of the trackwork, which is used to transport container through this portion of the manufacturing process and index the containers into position for inspection.

At a dwell position, the container is removed from the indexer, in this case the rotary turret 206, and loaded onto the mandrel 220 coincident with an inspection position 232. A force provided by a source fluid pressure causes the container to be removed from the turret 206 and transferred onto the mandrel 220. Thus, the force causes a movement by a container which transfers the container from the indexer 206 at the dwell position 228 onto and over or about the mandrel 220 at the inspection position 232 across the horizontal offset between dwell position and the inspection position 232. The imager, in this case a camera 240, is mounted to the inspection station 200 and pointed at the mandrel 220. The imager collects data for an optical evaluation of the ink graphic.

The imager data are collected by a computer system, which may comprise one or more computers 300 and/or controllers/processors in communication with one another and in communication with the camera 240. A software routine is stored in a non-transitory memory. A further software may perform a pass/fail analysis based on the data against a pre-determined manufacturing tolerance or customer specification to determine the quality of the ink graphic.

As in any container manufacturing system, there are upstream and downstream processes 500,600 which are typical to container manufacturing and well known to those in the art. For example, upstream processes 500 may include material blanking, bending and forming, extrusion, trimming, washing, pre-decoration basecoating, etc. Downstream processes 600 may include inspection, drying, necking, flanging, palletizing, etc.

Referring to FIG. 1, a closed-loop control 700 provides communication between the decorator, upstream and downstream processes 500,600. This closed-loop control 700 provides feedback from the downstream processes 600 to upstream processes, primarily the decorator 100, to automatically regulate, control, adjust, the quality, shape, form, etc. of the ink graphics applied to containers in the manufacturing queue 14.

The closed-loop feedback 700 is generally responsive to the inspection station 200 wherein the decorator 100 is automatically adjusted in response to the optical evaluation performed at the inspection station 200.

The closed-loop feedback is controlled by one or more computers 704 comprising processors in communication the inspection station 200 and the decorator to accomplish the closed-loop feedback instruction to the decorator 100 and, in some cases, other upstream processes 500. These computers 704 may be separate to the decorator 100, inspection station 200, and the upstream and downstream processes 500,600. Alternatively, a single computer may be provided which controls all of the various processes, including the closed-loop feedback. Still further, any combination of these processes having dedicated computers and an external main computer or computers may be provided as long as the functionality described herein is maintained and suitably accomplished.

In addition to the functions previously described, the closed-loop feedback system 700 controls communications between the decorator 100 and upstream and downstream processes 500,600. It follows that computers 700 includes a memory on which one or more software routines are stored. The computer 700 acts as a controller that sends signals to the elements of the decorators 100 regarding corrective actions or functions available to the decorator 100 to ensure properly decorated containers, these include the alterations, adjustments, changes, edits, etc. to actual ink graphics applied to the container, including, but not limited to, volume of ink, application of ink, pattern of ink, and speed of deposit of the ink. The system can determine whether or not to use an ink (dynamically enable/disable an ink supply). A curing system within a digital decorator can also be adjusted (more or less energy usage). The computer 700 provides controls, commands, or signals which determine a shape of the desired pattern of ink 112 transferred from the plurality of inkjet printing heads 108 to the printing surface 132 of the image transfer belt 116. A length of the desired pattern of ink 112 on the image transfer belt 116 preferably corresponds to a length of a segment of the endless image transfer belt 116 which is either less than or equal to a circumference of each beverage container body 14 or greater than or equal to a circumference of each beverage container body 14. One aspect of the invention is directed to inspecting an attribute of print quality to ensure each container in the manufacturing queue 14 continues to be processed without interruption or substantial interruption. Here, the term "substantially" is less than one hour in the case of eliminating the need to stop production to clean print heads; however, it is less than eight hours when the system eliminates a need to revert to pre-press work and create a new output design.

Using the closed-loop feedback system 700 in combination with the decorator 100, the inspection station 200 and the upstream and downstream processes 500,600, a manufacturing run comprising the manufacture of a plurality of containers in a manufacturing queue 14 and designated for sale and/or delivery to one or more customers can be processed without substantial interruption, preferably continuously and without interruption and adorned with a plurality of ink graphics arts wherein each ink graphic in the plurality of ink graphics is unique relative to a remaining population of ink graphics in the plurality of ink graphics. In other words, there is no limit to the number of different finished designs or ink patterns that can be delivered to consecutively container while adhering to customer and manufacturing ink graphic specifications and requirements.

It is further an aspect of the invention that changes to the upstream and downstream processes 500,600 may be initiated by the closed-loop feedback system 700. By way of non-limiting example, regarding upstream processes 500, adjustments to an amount of basecoat applied can be made, and/or adjustments to washer chemistry or speed to affect surface energy of containers can be made. Additionally, an oven system, upstream or downstream 500,600 may have adjustable energy which could be tuned by the closed-loop system. Here, an "oven" is strictly a part of upstream or downstream processes 500, 600, whereas the printing apparatus curing system is a part of the decorator 100.

It is further contemplated that the closed-loop system 700 makes or controls decorator adjustments based on changes in atmospheric conditions, such as temperature or barometric pressure, which may adversely affect the quality of the ink graphics delivered by the decorator. For example, an increase in temperature may affect ink viscosity or performance; temperature and humidity can have a substantial effect on digital color stability and hue, the size of the ink droplets, and health of the printheads. A closed-loop system can make adjustments within the decorator to aid work arounds or corrective actions taken to alleviate these issues.

In an exemplary preferred embodiment, the system 10 can be programmed to the point that this decision can be made without operator involvement. Each process option is configured to either allow or not allow the change to be made without operator authorization.

One illustrative example comprising a digital container decorator includes generating multiple source graphics for each job in a manufacturing run. Each of these graphics varies or is unique in a way which makes each graphic more or less difficult to print relative, or compared to, another graphic in the job or run, e.g. a queue of metallic container bodies, or utilizes a slightly different color spectrum. When a particular print variation/defect/anomaly occurs, the print variation is detected in a closed-loop fashion. Based on the particular failure, a different source graphic is be chosen.

In another illustrative example, a manufacturing run comprises a queue of a plurality of metallic containers designated for sale or delivery to a first customer. The manufacturing run further comprises a plurality of unique digital source files, each including a similar graphic instruction but in varying shades of a color. As the manufacturing run continues, the varying shades of the color shift due to, for example, a change in atmospheric condition, e.g., temperature or barometric pressure, in the plant. A feedback loop from an inspection device to the digital container decorator signals the digital decorator or a processor in communication with the digital decorator to automatically, without user intervention, switch to a different unique digital source file to preserve color within manufacturing tolerance and customer specifications.

In another illustrative example, a manufacturing run as defined above comprises a graphic with one or more machine-readable codes, e.g., in the form of numbers and/or a pattern of parallel lines of varying widths, such as an embedded barcode. The machine readable codes are embedded at differing levels of visibility. Many of these machine-readable codes are purposely designed to be inconspicuous to the human eye and more susceptible or sensitive to degradation in the printing process. One example of such an inconspicuous or imperceptible coding is produced by Digimarc Corporation of Beaverton, Oregon and is described in U.S. Pat. No. 7,044,395 B1, which is hereby incorporated by reference as if fully set forth herein, and for a specific purpose of describing such inconspicuous coding.

When an inspection device identifies degradation of the machine-readable codes, A feedback loop from the inspection device to the digital container decorator signals the digital decorator, or a processor in communication with to the digital decorator, to automatically, without user intervention, switch to a different digital source file to switch to a different version of the source file which is easier to print.

In another illustrative example, a manufacturing run as defined above comprises a plurality of digital source files for the same graphic image, each having a unique resolution level. For instance, a lower resolution digital source file can be employed to hide or conceal certain print anomalies caused by a poorly operating nozzle. If an inspection device recognizes an out of tolerance situation with respect to a pre-determined minimum acceptable resolution, a feedback loop from the inspection device to the digital container decorator signals the digital decorator, or a processor in communication with the digital decorator, to automatically, without user intervention, dynamically adjust (raise or lower) resolution as needed.

In another illustrative example, a single manufacturing run comprises a manufacturing queue 14 comprising a plurality of containers to be decorated on the same digital decorator wherein a first subset of the plurality of containers is designated for delivery/sale to a first customer and a second subset of the plurality of containers is designated for delivery/sale to a second customer. In this case, a first digital source file has a first graphic for the first customer and a second digital source file has a second graphic, different from the first graphic, for the second customer. If, during the decorating of the first subset of the plurality of containers, an unrecoverable print quality issue (i.e. one that cannot be corrected during the run of the first subset) arises, a feedback loop from the inspection device to the digital container decorator signals the digital decorator, or a processor in communication with the digital decorator, to automatically, without user intervention, switch over to a graphic file associated with, or destined for, the second subset of the plurality of containers. Thus, the manufacturing queue 14 continues to be processed/decorated.

Non-limiting examples of unrecoverable print quality issues include an "out of supply" condition related to one or more graphics, such as a low or exhausted ink level or a coating which applies to the first graphic but not the second graphic.

An advantage of the present invention is that it transforms a decorating line/process into a resilient line which does not stop when certain manufacturing defects/situations occur. Besides submitting multiple variations of the same job, there are likely other variables that can be adjusted, manipulated, accounted for in the closed-loop process of the present invention.

Figure 5:
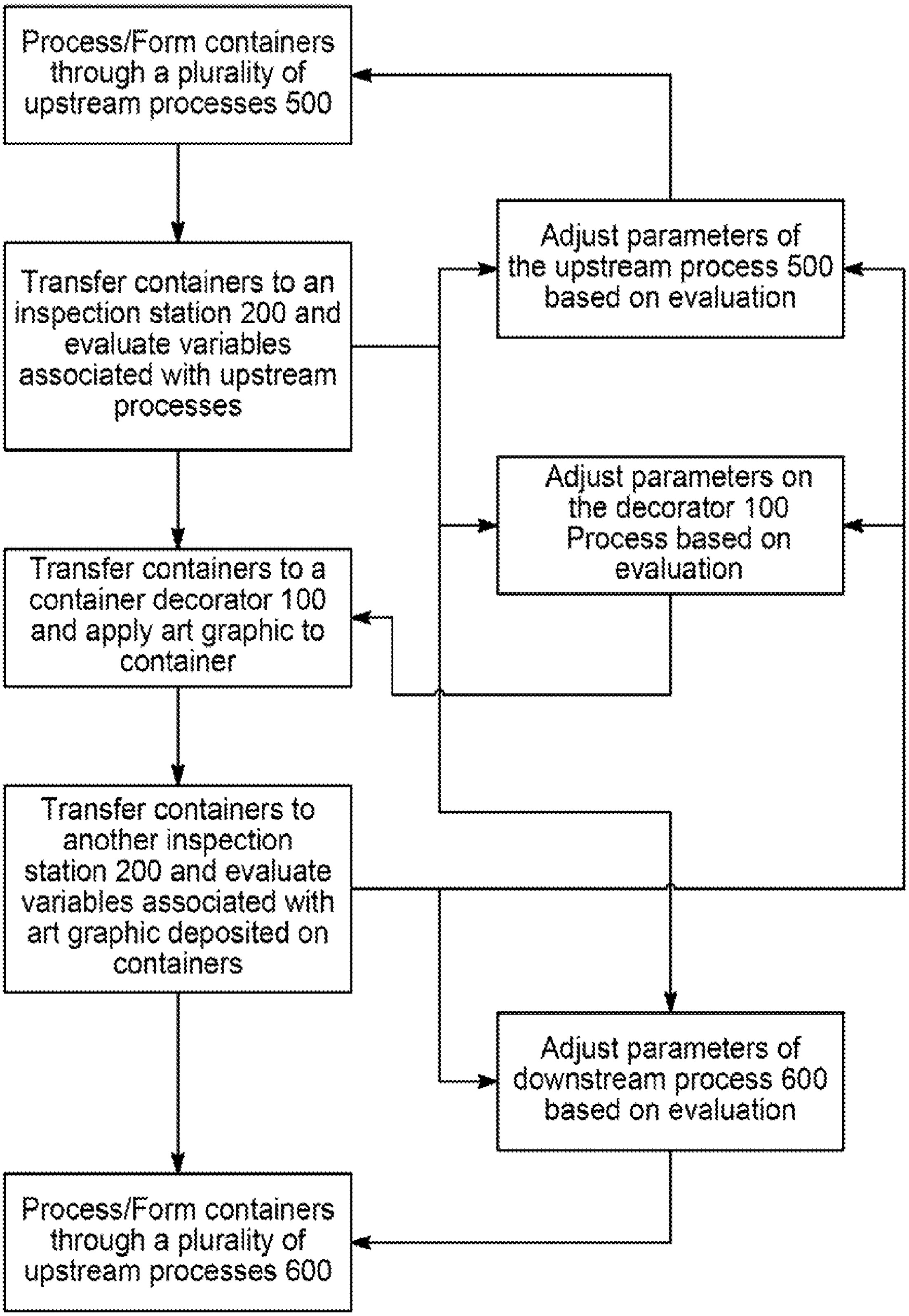
FIG. 5 shows a method of using a system according to the present invention.

As shown in FIG. 5, another advantage is related to a quality control method. Namely, the system enables all the measurements described above to be saved in a memory of a computer or other storage device. Thus, operators have data available to make a full assessment of all portions of a given container production line, and they are able optimize manufacturing variables to improve container manufacturing performance. For example, operators are able to make smarter decisions about use of supplies and energy. More particularly, the operator or facility could determine and use less (i.e. minimize) or more volume of basecoat material by using less or more volume of ink from the decorator, and, because less or more ink is utilized, it takes less or more energy to cure the ink in terms of duration and/or energy units; thus, energy consumption can be decreased. Additionally, using less or more basecoat (or varnish) requires less or more energy applied in the pre-decoration oven, again, resulting in a possible decrease in energy consumption. The curing may be thermal curing (degrees, BTUs, Joules), ultraviolet radiation curing ($W/m^2$), electron beam curing (Rad or Gy), infrared radiation curing ($W/m^2$).

While the specific embodiments have been illustrated and described, numerous modifications come to mind without significantly departing from the spirit of the invention, and the scope of protection is only limited by the scope of the accompanying Claims.

What is claimed is:

1. A system for decorating multiple containers in a single manufacturing run, the system comprising:

a decorator, the decorator comprising:

a source of ink; and a print site, wherein an ink graphic is deposited to each container in a plurality of containers that make up a manufacturing queue at the print site;

an inspection station upstream from the decorator, the inspection station performing an evaluation of at least one manufacturing variable associated with at least one process upstream from the decorator on at least one container in the plurality of containers that make up the manufacturing queue;

a closed-loop feedback responsive to the evaluation performed at the inspection station wherein an automatic adjustment to the decorator to at least one decorator parameter is made in response to the evaluation performed at the inspection station; and one or more processors in communication with the inspection station and the decorator, the one or more processors controlling an analysis of the evaluation against a pre-determined manufacturing tolerance and a response to the evaluation by the decorator.

2. The system of claim 1 wherein the ink graphic deposited on each subsequent container in the plurality of containers that make up the manufacturing queue is automatically adjusted without user intervention in response to the evaluation performed at the inspection station.

3. The system of claim 1 further comprising:

a non-transitory memory on which one or more software routines are stored which control the analysis of the evaluation and the response to the evaluation by the decorator.

4. The system of claim 2 wherein the automatic adjustment includes making an adjustment to a manufacturing process upstream from the decorator in response to the evaluation.

5. The system of claim 2 wherein the automatic adjustment is made to a manufacturing process downstream from the decorator in response to the evaluation.

6. The system of claim 2 wherein the automatic adjustment to the decorator in response to the evaluation comprises degrading an attribute of print quality to ensure each container in the manufacturing queue continues without interruption.

7. The system of claim 2 wherein the automatic adjustment to the decorator is in response to an optical evaluation, the automatic adjustment comprising improving an attribute of print quality to ensure process of each container in the manufacturing queue continues without interruption.

8. The system of claim 1 wherein the single manufacturing run includes a plurality of graphics, wherein a first subset of the plurality of containers receives a first graphic and a second subset of the plurality of containers receives a second graphic, and the first and second graphics are unique relative, or compared, to each other, and wherein the automatic adjustment to the decorator responsive to the evaluation comprises choosing one of the first or second graphics to be applied to one or more remaining undecorated containers in the manufacturing queue.

9. The system of claim 1 wherein the decorator is automatically responsive to changes in atmospheric conditions via the closed-loop feedback.

* * * * *